Feb. 11, 1958     D. G. WENDEL     2,822,618
POCKET SURVEYING DEVICE
Filed Dec. 15, 1952     2 Sheets-Sheet 1
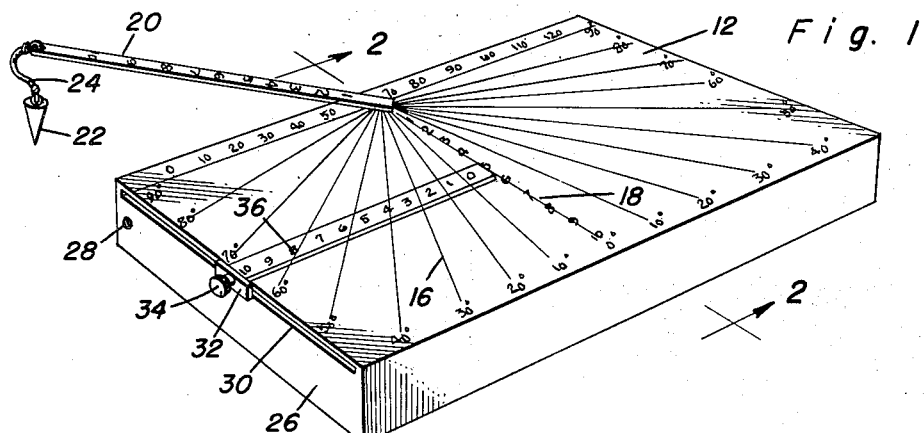
Fig. 1
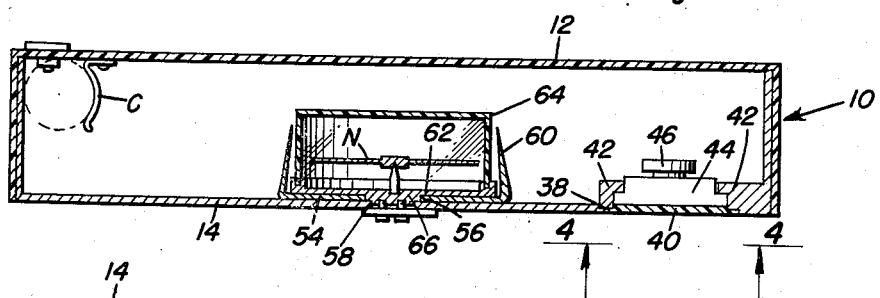
Fig. 2
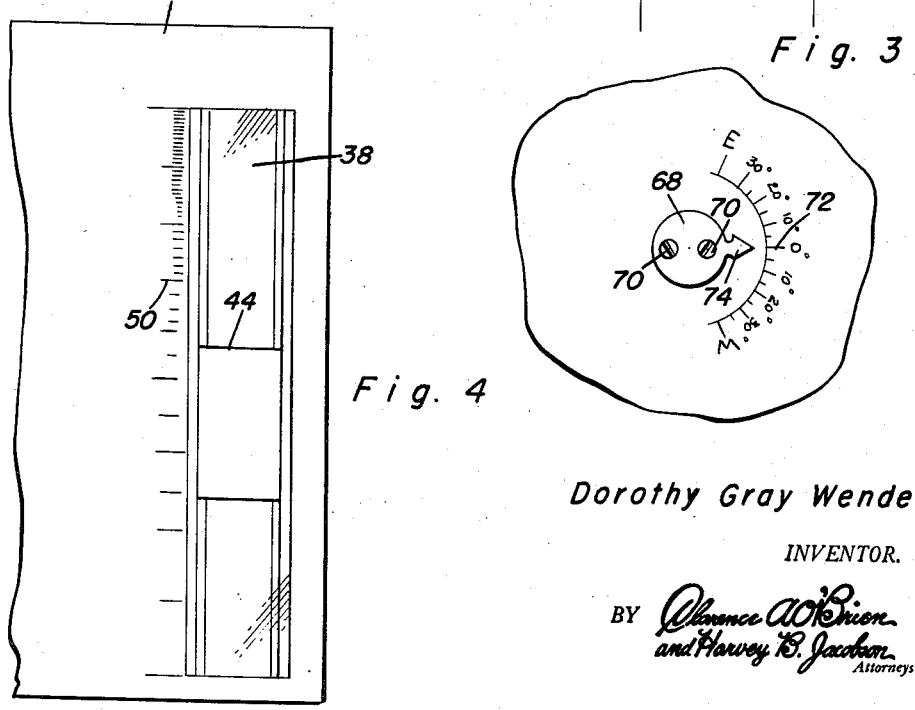
Fig. 3
Fig. 4
Dorothy Gray Wendel
INVENTOR.
BY *Clarence A. O'Brien*
*and Harvey B. Jacobson*
Attorneys Feb. 11, 1958 D. G. WENDEL 2,822,618
POCKET SURVEYING DEVICE
Filed Dec. 15, 1952 2 Sheets-Sheet 2
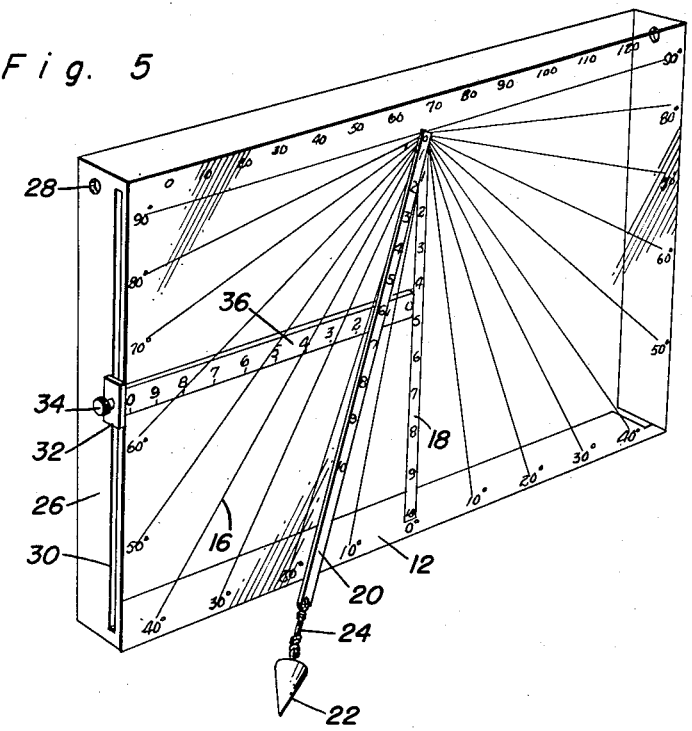
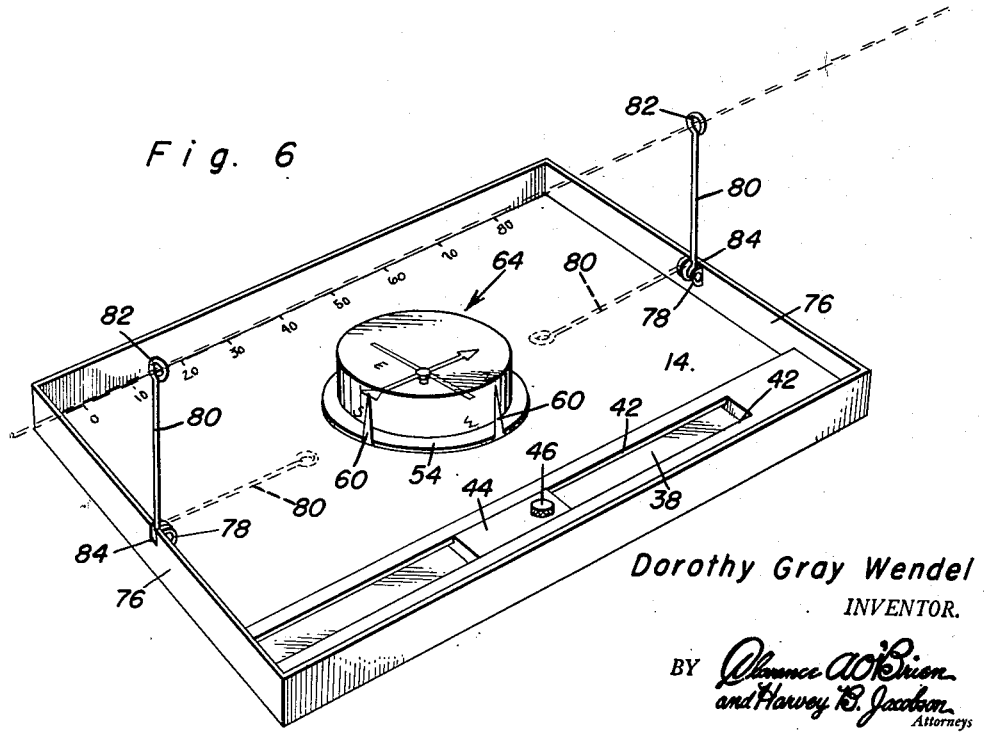
Dorothy Gray Wendel
INVENTOR.

United States Patent Office 2,822,618
Patented Feb. 11, 1958

2,822,618

POCKET SURVEYING DEVICE

Dorothy Gray Wendel, Llallagua-Siglo, Bolivia

Application December 15, 1952, Serial No. 325,952

1 Claim. (Cl. 33—72)

This invention relates to new and useful improvements in pocket instruments and the primary object of the present invention is to provide a pocket type instrument capable of being used as a surveying compass, marching compass, alidade, measuring scales for maps, protractor, mining compass, clinometer, goniometer, range finder, sextant, plumb line and level.

Another important object of the present invention is to provide an angle and/or distance determining device involving a compass rotatively supported upon a base together with means for rotating and for locking the compass in a selected rotated position in order to compensate for magnetic declination, and further, wherein the compass may be utilized for setting a bearing for marching or the like.

Yet another object of the present invention is to provide an instrument of the aforementioned character including a graduated pendulum pivotally mounted upon a protractor and coacting with scales applied to the protractor for determining unknown parts of a right triangle and which pendulum may also be employed for laying plumb lines and for determining the elevation of a distant object.

A still further aim of the present invention is to provide a device for determining and/or laying off angles, distances or bearings, which device is extremely simple and practical in construction, strong and reliable in use, efficient and durable in operation, inexpensive to manufacture, and otherwise well adapted for the purposes for which this same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the upper half of the instrument case;

Figure 2 is a vertical sectional view taken substantially on the plane of section line 2—2 of Figure 1 and showing the lower half of the case within the upper half of the case;

Figure 3 is an enlarged fragmentary bottom plan view of Figure 2;

Figure 4 is a fragmentary plan view of Figure 2 taken substantially on the plane of section line 4—4 of Figure 2;

Figure 5 is a perspective view showing the upper half of the case in use for determining unknown parts of a right triangle; and, Figure 6 is a perspective view showing the lower half of the case and the sight arms raised to an operative position.

Referring now to the drawings in detail, wherein for the purpose of illustration, there is disclosed a preferred embodiment of the present invention, the numeral 10 represents the instrument generally including similar case-forming rectangular halves 12 and 14. Half 12 is transparent and constitutes a protractor and its outer face is provided with angle lines 16 and a stationary scale 18 that is coincident with the zero degree line of the lines 16. Half 14 has a side wall and a generally flat base.

The lines 16 radiate from a common center point which also coincides with the zero graduation of scale 18. A graduated pendulum 20 is pivoted at one end to the half 12 at the center point and the graduations on the pendulum 20 progressively increase as they extend from the center point. A plumb bob 22 is attached to the free end of pendulum 20 through the medium of a flexible element or cord 24.

Case forming half 12 is provided with a peripheral wall including spaced parallel flanges 26 each of which is provided with an end aperture 28. The aperture 28 in one end flange is in registry with the aperture in the other end flange and these apertures form peep sights or sighting apertures or can be employed for inserting a string line so that the device can be used as a miner's clinometer.

One of the end flanges 26 is formed with an elongated slot 30 that receives a slide 32 having a pressure plate (not shown) attached thereto by a screw 34 whereby the slide may be adjusted longitudinally of the slot. A scale 36 is fixed at one end to the slide and underlies the case half 12. The scale 36 extends toward the scale 18 and is disposed perpendicular thereto.

Half 14 is formed with an elongated opening 38 in which a window glass or plastic sheet 40 is suitably mounted. Parallel guide ways 42 on the half 14 along side of opening 38 receive the step side edges of a slide 44 having a finger-gripping knob 46. The slide 44 in registry with the glass 40 registers with longitudinal scale 50 on the under side of case 14 (Figure 4).

When the case is disposed vertically and held the proper distance from the eye of a user, the slide 44 may be raised to position an object in the opening 38 between the slide and the upper edge of the opening, and the distance from the user to the object is determined, readily, by scale 50 in conjunction with slide 44. The scale 50 is graduated to permit reading in feet of the object in the same way as a conventional viewer used quite extensively with photographic equipment.

A plate member 54 rests upon the bottom wall of half 14 and is formed with a central aperture 56 that is slightly larger than and that registers with an opening 58 in the bottom wall of half 14. A plurality of circumferentially spaced upstanding pointer arms 60 extend upwardly from the plate member 54 and one of these arms is painted red for a purpose presently to be described.

The bottom wall 62 of a compass 64 rests upon the plate member 54 and is formed with a central lug 66 that extends through aperture 56 and opening 58. The part of lug 66 located in opening 58 is of slightly reduced diameter in comparison to the part in aperture 56.

A pointer supporting disk 68 is secured to the lower end of lug 66 by screws 70 and underlies the case half 14. The screws 70 are tightened to clamp disk 68 against half 14 in order to retain the pointer supporting disk 68 and compass 64 in a selected rotated position. Graduations 72 on the case half 14 about the pointer 74 of disk 68 are provided for indicating magnetic declination.

The parallel end flanges 76 of half 14 each support a pair of inwardly extending ears 78 between which the lower eye ends of sighting arms 80 are pivoted. The outer free ends of the arms 80 terminate in eyes 82 that will register with each other when they are swung to a position perpendicular to the case half 14 as shown by full lines in Figure 6. The flanges 76 are notched, as at 84, to accommodate pivoted eye ends of the arms 80 when the latter are swung downwardly toward the half 14.

In practical use of the present invention, after the difference between magnetic north and true north has been determined for the locality from magnetic declinations charts, the screws 70 are unloosened and the disk 68 is rotated to the proper correction on scale 72, and then the screws 70 are tightened to lock the compass case in this fixed position.

In order to set a line for marching, the red colored pointer 60 of plate member 54 is moved until it indicates the desired bearing. Then half 14 is rotated until the north end of the needle N is opposite this red pointer. Holding this position, a sight is taken along the sighting arms 80 to establish the line of march. Since the compass case 64 has a transparent upper portion, the sighting arms can be aligned to the eye at the same time the eye is matching the red pointer opposite the north end of the needle.

To determine the bearing to a point in the distance, sight along the arms 80 to a distant point and the plate member 54 is rotated until the red pointer arm 60 adjoins the north end of the needle. The instrument is lowered from the eye and the compass read. If the position of the north end of the needle is difficult to view, one or more of the other pointers can be adjusted to the other points of the needle although the red pointer must always be the one that adjoins the north point.

Obviously the eye ends of the arms 80 may receive a string so that the device may be employed as a mining compass.

The instrument above described is capable of being used in many capacities for the purpose of determining distances, angles, and other such similar measurements. The device may also be used for laying off desired lines on maps or the like for measuring distances on a map. When the case forming halves 12 and 14 are not in use, they are slipped one over the other as shown in Figure 2 and the plumb bob 22 is engaged with a clip C attached to the half 12 to be held against movement during transporting of the device.

What is claimed as new is as follows:

A pocket instrument comprising a generally flat base having an opening therein, a plate resting directly on the upper surface of the base and having a series of circumferentially spaced upstanding pointer arms that are generally perpendicular to the surface of said base, a compass overlying the plate and having a compass case, said compass case including a bottom wall which fits directly on the top surface of said plate and transparent side wall and top on said bottom wall of said compass case so that said upstanding pointer arms may be sighted through said compass case, said plate having a central aperture, said base having its opening in registry with said central aperture with said central aperture being slightly larger in diameter than said opening, a lug depending from said bottom of said compass case and having a part disposed in said aperture, another part of said lug which is slightly reduced in diameter being located in said opening, a pointer in contact with the bottom surface of said base, a plurality of screws securing said pointer to said lug and being tightened to clamp the pointer against the underside surface of said base in order to lock the compass against rotation, and magnetic declination graduations on said base about said pointer to indicate the rotation of said compass to compensate for magnetic declination.

References Cited in the file of this patent

UNITED STATES PATENTS

| | | |
|---|---|---|
| 43,036 | Martin | June 7, 1864 |
| 975,682 | Ferber | Nov. 15, 1910 |
| 1,042,079 | Brunton | Oct. 22, 1912 |
| 1,338,951 | Nadel | May 4, 1920 |
| 1,401,205 | Suter | Dec. 27, 1921 |
| 1,468,368 | Morgan | Sept. 18, 1923 |
| 1,511,668 | Glanzer | Oct. 14, 1924 |
| 2,189,964 | Sealey | Feb. 13, 1940 |
| 2,249,728 | Cross | July 22, 1941 |
| 2,487,044 | Cude | Nov. 8, 1949 |
| 2,569,796 | Browning | Oct. 2, 1951 |

FOREIGN PATENTS

| | | |
|---|---|---|
| 443,061 | France | July 5, 1912 |
| 46,860 | Sweden | Apr. 21, 1920 |
| 366,210 | Great Britain | Feb. 4, 1932 |
| 58,550 | Norway | Oct. 18, 1937 |
| 61,179 | Norway | July 24, 1939 |
| 99,360 | Sweden | July 9, 1940 |